No. 772,078. Patented October 11, 1904.

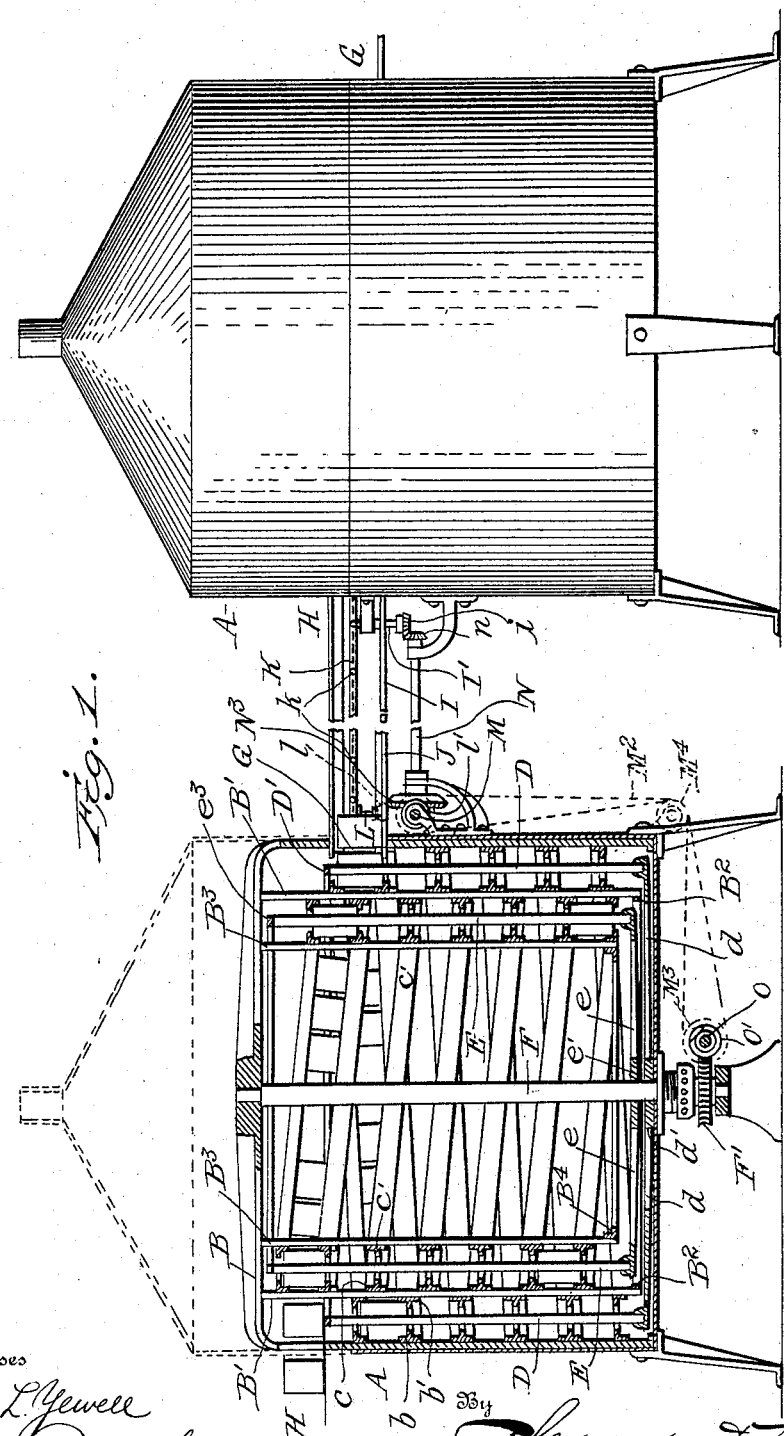

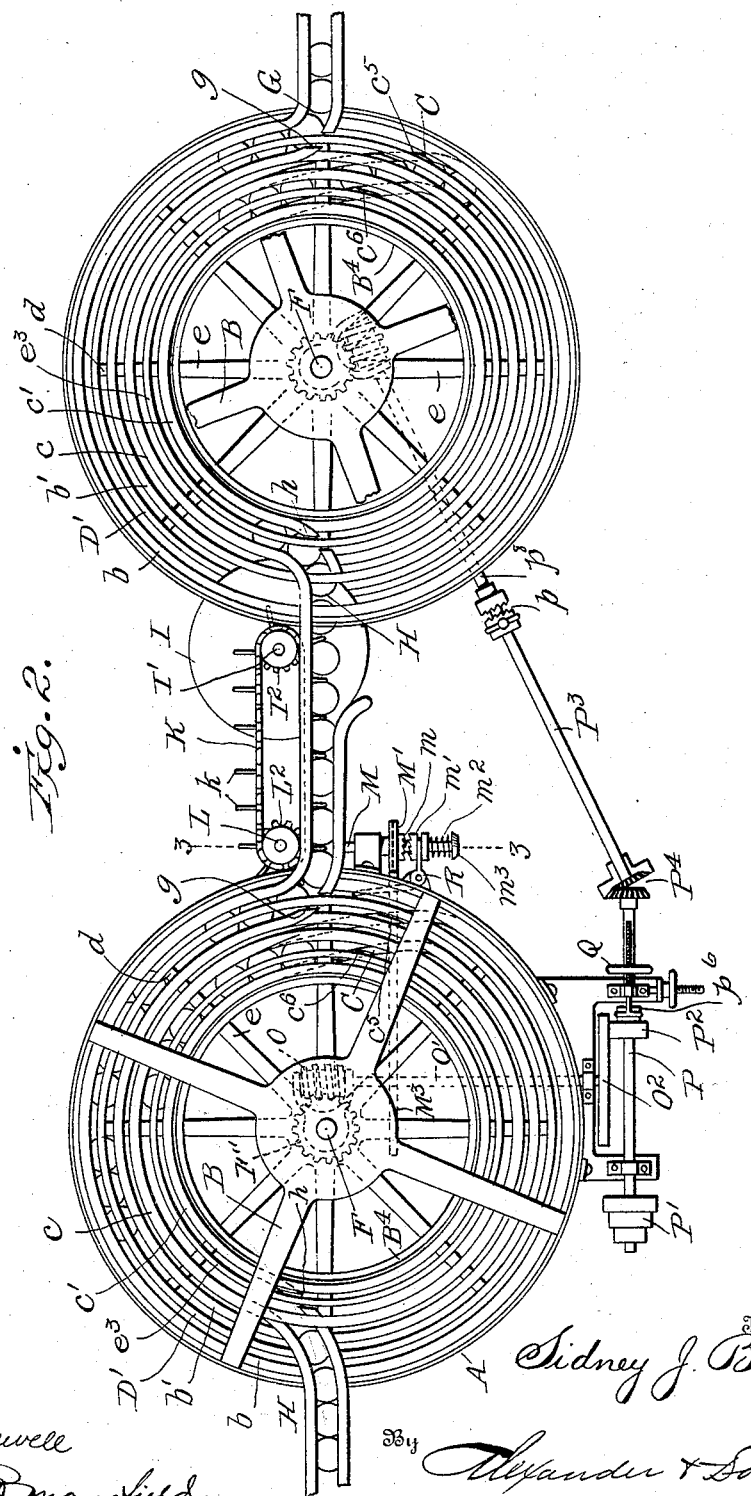

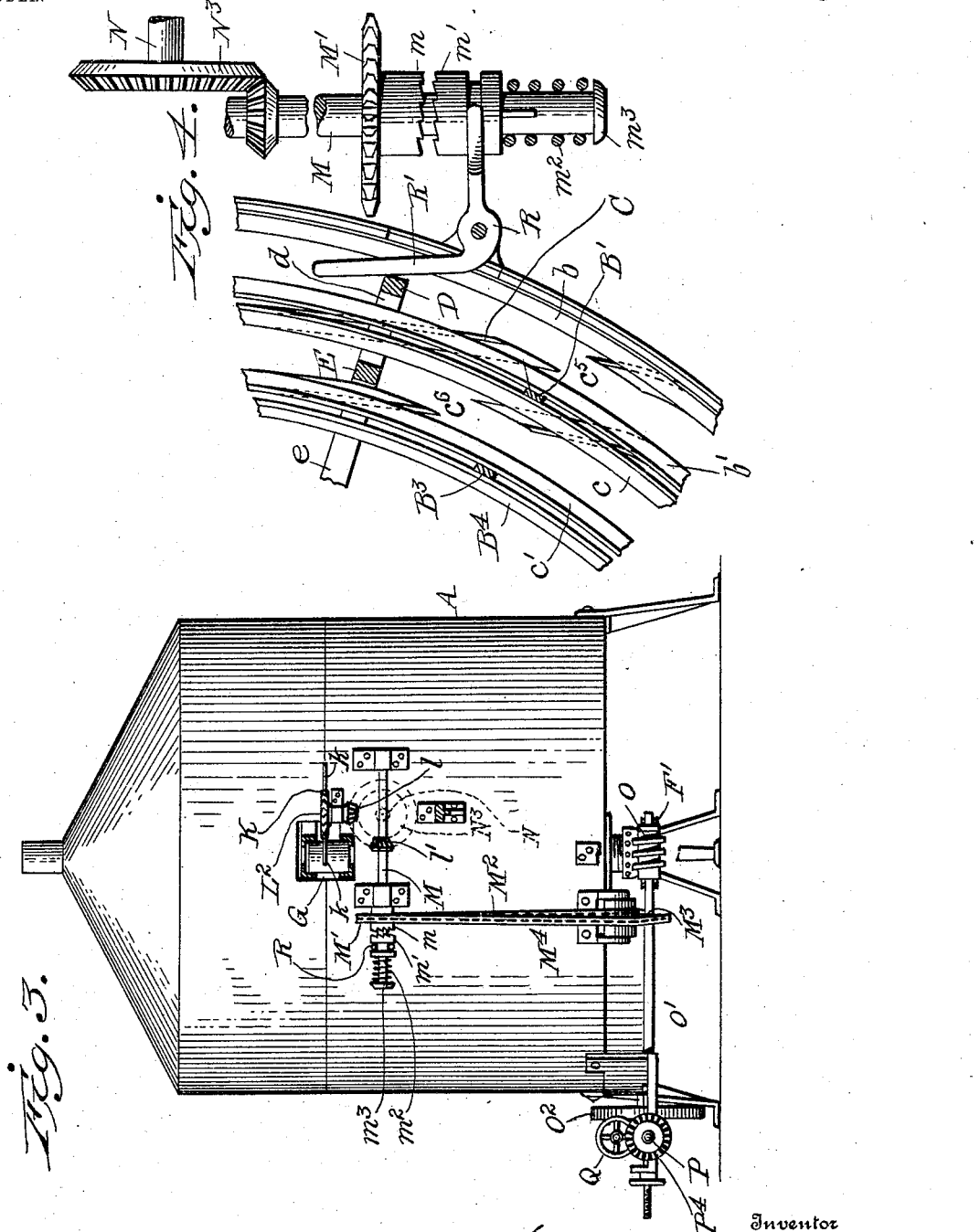

UNITED STATES PATENT OFFICE.

SIDNEY J. BAKER, OF MUSCATINE, IOWA, ASSIGNOR OF ONE-HALF TO FRANK J. STOHR AND PAUL W. FREUND, OF MUSCATINE, IOWA.

CANNING-MACHINE.

SPECIFICATION forming part of Letters Patent No. 772,078, dated October 11, 1904.

Application filed May 20, 1904. Serial No. 208,895. (No model.)

*To all whom it may concern:*

Be it known that I, SIDNEY J. BAKER, of Muscatine, in the county of Muscatine and State of Iowa, have invented certain new and useful Improvements in Canning-Machines; and I hereby declare that the following is a full, clear, and exact description thereof, reference being had to the accompanying drawings, which form part of this specification.

This invention is an improvement in canning-machines, and has special reference to the apparatus for exhausting, sterilizing, and cooking canned fruits and vegetables, and is especially adapted for use in what is called the "continuous-process" canning, in which the filled cans are passed through an exhauster and then sealed and passed through the cooker, the cans practically moving continuously from beginning to the end of the operation, so that during their passage through the machine the cans are exhausted of atmosphere, sealed, and cooked, being delivered from the cooker ready for the store-room.

In the present invention the cans are sealed between the exhauster and cooker by hand or suitable machinery forming no part of the present invention, which has more particular reference to the peculiar construction of the canways and means for propelling the cans through the apparatus along such ways and in means for preventing the cans obstructing the ways or moving parts of the mechanism.

The invention will be described in detail with reference to the accompanying drawings, which illustrate a machine embodying the invention, and the constructions and combinations of parts in which the invention resides will be set forth concisely in the claims.

In the said drawings, Figure 1 is a side view of the complete apparatus, the exhauster being shown in side elevation and the cooker being shown in sectional elevation. Fig. 2 is a top plan view of Fig. 1, the exhauster and cooker being shown in plan with the cover removed. Fig. 3 is a detailed section on line 3 3, Fig. 2, and Fig. 4 is a detailed view of the can-conveyer-stopping device.

The cooker and exhauster are constructed practically alike, only the latter may be smaller than the former, as it is not necessary for the cans to remain as long within the exhauster as in the cooker, and in practice the exhauster may have less coils or tiers of canways than the cooker.

A description of the cooker will explain the exhauster, and similar letters of reference will be applied to similar parts, so that the explanation of the cooker will explain the exhauster, any slight differences in construction being particularly noticed hereinafter.

The cooker preferably comprises a cylindrical tank A, closed at bottom and ordinarily provided with a conical top, so that the vapors arising therein can be conducted off. The top is not shown in the drawings. Within this tank A are arranged two concentric spiral canways. As shown, each of these canways has five coils, the outer canway comprising the opposite T-rails $b$ $b'$, the rail $b$ being supported upon the walls of the tank, and the adjacent related rails $b'$ being attached to vertical bars $B'$, suspended from a spider $B$ above and supported on the walls of the tank. Said bars $B'$ are connected at bottom by an annulus or sheet-metal plate $B^2$, by which they are steadied, but do not interfere with the free movement of the can-propelling arms thereunder. The inner spiral canway inclines oppositely to the outer track and is composed of the outer rails $c$, which are attached to the bars $B'$, and inner rails $c'$, which are attached to bars $B^3$, also suspended from the spider $B$, and which are connected at their lower ends by an annulus or ring $B^4$. The bars $B^3$ terminate some distance above the lower ends of the bars $B^2$. The inner and outer canways are connected at their bottom by a switch $C$, so that the lowest end of the outer spiral canway communicates with the lowest end of the inner spiral canway. The cans descend the outer spiral canway, then pass through switch $c$ into the inner spiral canway, and ascend to the point of delivery. The cans are moved upon the respective ways by means of the pusher-bars D and E, the former working in the outer spiral and the latter in the inner spiral. These pusher-bars D are attached at bottom to arms $d$, radiating from a hub $d'$, attached to the lower part of a vertical shaft F, which is arranged axially of and within the tank and is supported in a suitable bearing attached to the bottom of the tank, and said bearing being properly stuffed to prevent leakage. One upper end of shaft F is journaled in the spider B. The upper ends of the arms D are connected by an annulus $D'$, so that they are kept in alinement and will operate to move the cans simultaneously on all the coils of the outermost canway. The cans are moved around the innermost canway by means of arms E, which are attached at their lower ends to arms $e$ on a hub $e'$, attached to shaft F above the arms $d$ $d'$, but below the lower ends of the bars $B^3$. The upper ends of bars E are connected by an annulus or ring $e^3$. The switch C is slotted at $c^5$ $c^6$ to permit the pusher-bars D and E to pass it. The cans are fed onto the uppermost coil of the outermost canway at the point G and are delivered from the uppermost coil of the inner canway at the point H. The points G and H are virtually switches, and the innermost bar of the entrance-switch G is slotted at $g$ to allow the passage of the pusher-bars D, while the outmost wall of the delivery-switch H is slotted at $h$ to allow the passage of the pusher-bars E.

So far the exhauster and cooking-machines are identical in construction. The cans may be fed into the exhauster at the point G by hand or by any suitable machinery. They are delivered from the exhauster at the point H onto a rotary disk I, from which they are delivered onto a platform or carrier J, which leads across to the entrance G of the cooker, the cans being moved along the platform by means hereinafter described. From the cooker the cans are delivered at the point H to any suitable reservoir. The disk I is mounted on a short vertical shaft $I'$, which may be suitably journaled in bearings on the platform J, and the shaft $I'$ is driven as hereinafter described. The disk I rotates more rapidly than the cans are moved by the pusher-bars E and D. Consequently as the cans reach this disk they will be moved thereby rapidly onto the platform J in position to be caught by the fingers $k$ of an endless carrier K, which runs over horizontal sprockets $I^2$ and $L^2$ on the upper ends of shaft $I'$ and L, respectively, shaft L being journaled in suitable bearings on the platform J, (or brackets attached to the cooker,) adjacent to the entrance G of the cooker. This carrier K moves the cans along the platform J and feeds them into the cooker at the point G. The shaft L is driven by means of gears $l$ $l'$, the latter being fastened on the inner end of a shaft M, journaled in brackets on the cooker and said shaft M being driven as hereinafter described. The shaft L, moreover, carries a beveled gear $L^3$, which meshes with a beveled gear $N^3$ on a shaft N, journaled in suitable supports below the platform J and extending across to the shaft $I'$ and driving the latter by means of two beveled gears $n$ $i$, thus imparting rapid rotary movement to the disk I. The gear $I^2$ is loosely journaled on the shaft $I'$, and motion is imparted to the conveyer-belt $K'$ from the gear $L^2$.

*The driving mechanism.*—The shaft F has a worm-gear $F'$ on its lower end which meshes with a worm O on a shaft $O'$, journaled in suitable brackets beneath the cooker and extending out to one side thereof and having on its outer end a friction-disk $O^2$, against which may be pressed a friction-pulley $P^2$ on a shaft P, journaled in suitable bearings at right angles to shaft $O'$ and driven by a cone-pulley $P'$ from any suitable source of power. The pulley $P^2$ is longitudinally adjustable on shaft P by any suitable means, a yoke $P^6$, whose stem has a threaded engagement with an adjusting-wheel Q, being shown in the drawings for this purpose, and the shaft P can be moved laterally by means of the adjusting devices shown in the drawings, so that the frictional gearing can be adjusted to drive shaft $O'$ at any desired speed. The frictional driving mechanism and its devices are not claimed in this application, therefore need not be more particularly described.

The shaft F of the exhauster may be driven by worm-gearing from shaft $P^8$, which may be connected to and disconnected from a counter-shaft $P^3$ by means of clutch $p$, shaft $P^3$ being driven from shaft P by beveled gears $P^4$. I do not, however, restrict myself to the particular means for driving the shafts F, (shown in the drawings,) although I consider them the preferred means.

The disk I, as before stated, moves the cans from the exhauster more quickly than the cans are moved by the pusher-bars D and E or the conveyer K. Consequently there is no liability of the conveyer becoming clogged or the cans becoming caught and jammed in the exhauster.

To prevent the cans entering the cooker being caught by the pusher-bars D, just as the bars pass through the slot $g$ at the entrance G mechanism is provided for automatically stopping the feed of the cans by the conveyer K just before the pusher-bars D enter the slot $g$.

By reference to Figs. 2, 3, and 4 it will be seen that the sprocket $M'$ is loosely mounted on the shaft M and is driven by a sprocket belt or chain $M^2$ from a pulley $M^3$ on shaft $O'$. This chain may be passed around guide-pulleys $M^4$ at the bottom of the cooker, as shown in Fig. 1. The sprocket $M'$ has a clutch-face $m$ on its hub, opposed to which is a clutch-block $m'$, splined on shaft O and movable into and out of engagement with the clutch $m$ by means of an oscillating lever R, which is pivoted on the tank and has a long curved arm $R'$, which projects into the path of the pusher-bars D, so that as the said bars approach slot $g$ they contact arm $R'$ and rock lever R, so as to throw the clutch $m'$ out of engagement with clutch $m$. This will stop the rotation of shaft M, and consequently of the conveyer K, until the pusher-bar has passed beyond the end of the lever-arm R' and through the slot $g$, so that said pusher-bar will be out of the way of any incoming cans moved on by the conveyer K, and said conveyer will be stopped at a time when no can will be in position to lock the pusher-bar at the slot $g$. As soon as the pusher-bar passes the arm R' the clutch is thrown into engagement with the sprocket by means of a coil-spring $m^2$, interposed between the clutch-block $m'$ and the collar $m^3$ on the end of shaft M. (See Fig. 2.)

Operation: An exhauster and a cooker constructed substantially as described are arranged adjacent to each other, and the exit H of the exhauster is connected with the inlet G of the cooker by means of the platform or passage-way J, so that the cans can be fed automatically from the exhauster to the cooker. The cans fed into the exhauster at the point G are carried around and down the outer spiral canway, then passed into the lower end of the inner spiral canway through the switch C, and moved around and up by the inner spiral canway to the delivery-point H, where they pass onto the rotary disk I and are speedily transferred onto the platform or passage-way J, along which they are moved by the conveyer K to the inlet G of the cooker. After entering the latter the cans are passed down the outer spiral canway of the cooker to the bottom thereof, switched at the point C into the lower end of the inner spiral canway, and ascend to the delivery-point H, where they may pass onto any suitable receiver or be removed by hand. The path of the cans is thus practically continuous from the point where they enter the exhauster to the point where they leave the cooker, and their movement is also practically continuous, except that they are slightly expedited by the disk I and may be momentarily arrested at the entrance to the cooker by the action of the clutch-tripping lever R' to prevent the pusher-bars catching the cans at the slot $g$ in the entrance to the cooker. The cans are filled before being placed in the exhauster, and during their passage through the latter they are highly heated and exhausted of air and gases. As the cans pass across the shelf-platform J from the exhauster toward the cooker they are capped and sealed and then moved into the cooker, where they are subjected to a cooking temperature and are held therein a sufficient length of time to thoroughly cook their contents, so that when they are delivered from the cooker they are in condition for packing and may be subsequently labeled, as usual.

The tanks may be heated in any suitable manner. I prefer to use steam-coils, but have not shown any heating apparatus in the drawings, as this forms no part of the present invention; neither do the covers for the tanks, which are ordinarily provided both to assist in retaining heat therein and to carry off vapors which may arise therefrom.

Having thus described my invention, what I therefore claim as new, and desire to secure by Letters Patent thereon, is—

1. In combination, a tank, a canway therein composed of opposite track-rails separated by an open space, a series of vertically-disposed pusher-bars arranged to move between the track-rails, and means for moving said pusher-bars laterally so as to propel cans on the ways.

2. In combination, a tank, two concentric series of spirally-arranged canways therein, the inner way being inclined in a direction opposite to the outer way, each way being composed of opposite separated track-rails, the ways communicating at bottom by a switch, and means for propelling the cans along said ways, substantially as described.

3. In combination, a tank, an inner and outer canway therein, a switch connecting the inner and outer ways at bottom, rotating arms underlying the outer and inner canway, vertically-arranged pusher-bars supported on said arms and extending up between the bars of the outer canway, a rotary series of arms below the inner canway, vertically-disposed pusher-bars connected to the latter arms and operating in the inner way, substantially as described.

4. In combination, a tank, a spiral canway therein, composed of opposite rails separated by an open space, a series of vertically-disposed pusher-bars arranged between the rails, rotary spiders arranged below the lowermost rails and supporting said pusher-bars and moving the same laterally around the tracks.

5. In combination, a tank, two concentric series of spirally-arranged canways therein, each being composed of opposite separated rails, and a switch connecting said ways at bottom; with vertically-disposed pusher-bars arranged between the track-rails and supports for said pusher-bars connected to a rotating shaft, substantially as described.

6. In combination, a tank, inner and outer spiral canways therein, a rotating series of arms underlying the inner canway, vertically-arranged pusher-bars supported on said arms and extending up between the bars of the inner canway, a rotary series of arms below the inner and outer canways, vertically-disposed pusher-bars connected to the latter arms and operating in the outer canways, and a switch connecting the inner and outer canways, at bottom said switch being slotted to permit the passage of the pusher-bars, substantially as described.

7. In combination, a can-cooking apparatus, a canway therein, and means for moving cans along said way; with means for feeding cans into said apparatus, and automatic devices for stopping the can-feeding mechanism, substantially as described.

8. In combination, a can-cooking apparatus, a canway therein, means for moving cans along said way, a can-supporting platform connected with the inlet of the apparatus, and means for moving cans along said platform into said apparatus; with automatically-acting devices for stopping the can-feeding means, substantially as described.

9. The combination of a tank, a canway therein, a series of pusher-bars moving through said way to propel cans thereon, a conveyer for feeding cans into said tank, a driven shaft for operating said conveyer, and means adapted to be operated by the pusher-bars to momentarily stop the conveyer, substantially as described.

10. The combination of a tank, a canway therein, a series of pusher-bars for moving cans along said way, a conveyer for feeding cans into said tank, a driven shaft for operating said conveyer, and a pivoted arm projecting into the tank adapted to be engaged by the pusher-bars, and means controlled by said arm for stopping the conveyer-feed as the pusher-bars approach the feed-opening, substantially as described.

11. In combination, a tank, an annular canway therein, laterally-movable pusher-bars moving through said way to propel the cans therein, a conveyer for moving cans into the tank, a driven pulley loosely mounted on said shaft, a clutch for locking said pulley to the shaft, and a lever for tripping said clutch adapted to be engaged by the pusher-bars t momentarily stop the conveyer, substantially as described.

12. The combination of a tank, a canway therein, means for moving cans along said way, and a rotatable disk adapted to remove the cans from the tank, substantially as described.

13. The combination of an exhauster, means for moving cans therethrough, a cooker, means for moving cans therethrough, a conveyer for carrying cans from the exhauster to the cooker, and mechanism substantially as described whereby the conveyer may be momentarily stopped as the can-moving devices in the cooker reach the inlet-point thereof.

14. The combination of an exhauster, means for moving cans therethrough, a cooker, means for moving cans therethrough, a platform arranged between the outlet of the exhauster and the inlet of the cooker, and means for moving cans along said platform; with a rotating disk for moving cans rapidly from the outlet of the exhauster onto said platform, substantially as described.

15. The combination of an exhauster, means for moving cans therethrough, a cooker, means for moving cans therethrough, a platform arranged between the outlet of the exhauster and the inlet of the cooker, a pusher or conveyer for moving cans along said platform, and mechanism for momentarily arresting the conveyer as the can-pushing devices in the cooker approach the inlet thereof, substantially as described.

16. The combination of an exhauster, a canway therein, and means for moving cans along said way to the outlet of the exhauster, a cooker, a canway therein, and means for moving cans along said canway to the outlet of the cooker, a conveyer extending from the outlet of the exhauster to the inlet of the cooker, a shaft and gearing for operating said conveyer, and a lever pivoted beside the cooker, having an arm projecting into the cooker adapted to be contacted by the can-pushing devices within the cooker as they approach the inlet thereof, whereby the conveyer may be momentarily thrown out of operation, substantially as and for the purpose described.

17. The combination of an exhauster, a canway therein, and means for moving cans along said way to the outlet of the exhauster, a cooker, a canway therein, and pusher-bars for moving cans along said canway to the outlet of the cooker, a platform extending from the outlet of the cooker to the inlet of the exhauster, a rotating disk for moving cans quickly from the exhauster onto said platform, an endless pusher or conveyer belt for moving cans along said platform, a shaft and gearing for operating said belt, and a lever pivoted beside the cooker having an arm projecting into the cooker, adapted to be contacted by the pusher-bars whereby the conveyer-belt may be momentarily thrown out of operation, substantially as described.

In testimony that I claim the foregoing as my own I affix my signature in presence of two witnesses.

SIDNEY J. BAKER.

In presence of—
PAUL FREUND,
SAMUEL T. LEWIS.